Figure 1:
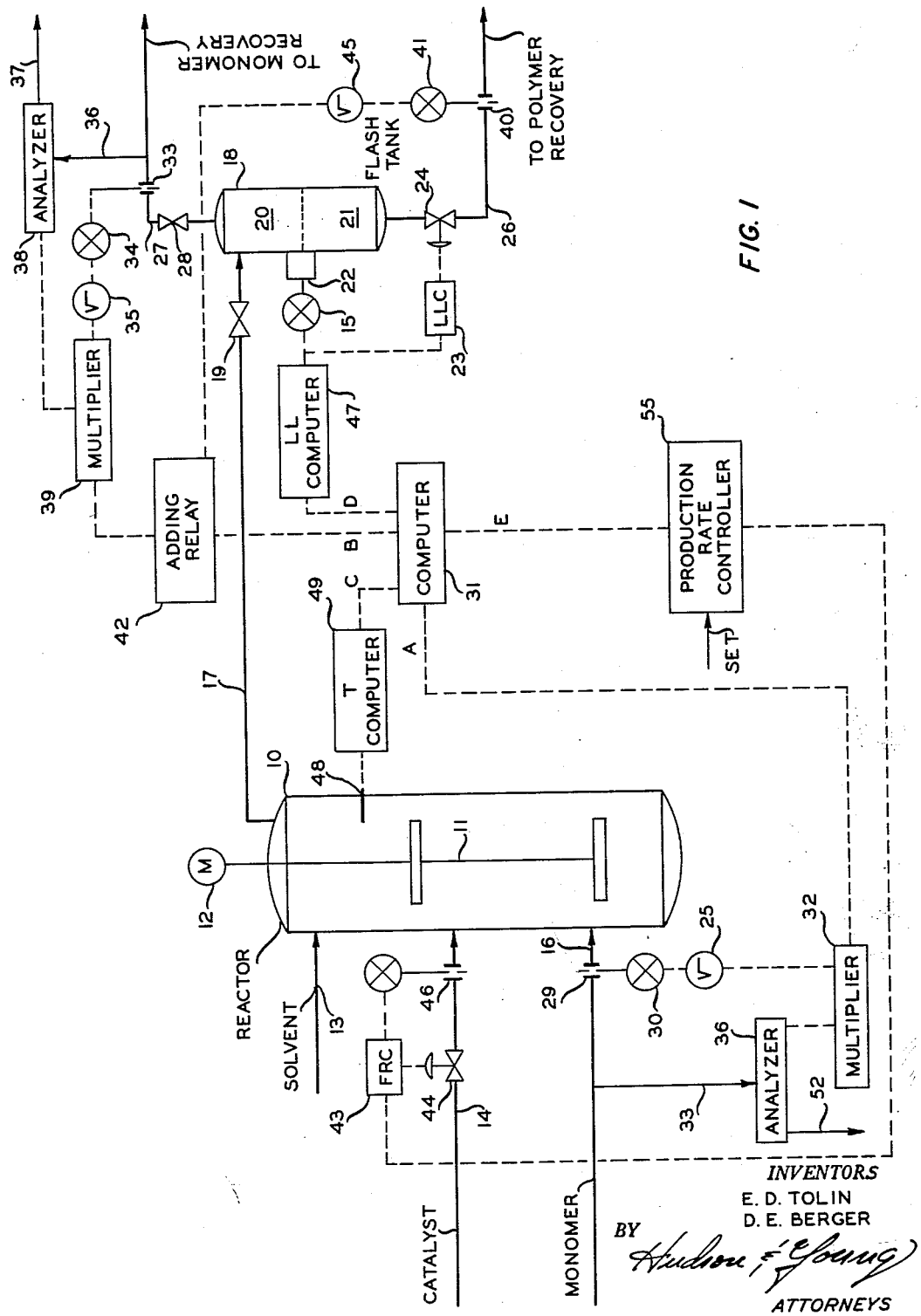

April 21, 1964   E. D. TOLIN ETAL   3,130,187
AUTOMATIC PROCESS CONTROL METHOD AND APPARATUS
Filed July 11, 1960   2 Sheets-Sheet 1

INVENTORS
E. D. TOLIN
D. E. BERGER
BY
ATTORNEYS

INVENTORS
E. D. TOLIN
D. E. BERGER
BY Hudson & Young
ATTORNEYS 3,130,187
AUTOMATIC PROCESS CONTROL METHOD
AND APPARATUS
Ernest D. Tolin and Donald E. Berger, Bartlesville, Okla., assignors to Phillips Petroleum Company, a corporation of Delaware
Filed July 11, 1960, Ser. No. 41,838
14 Claims. (Cl. 260—94.9)

This invention relates to an improved method for automatically controlling a chemical process. In another aspect, the invention relates to apparatus suitable for regulating a continuous chemical process to insure a constant production rate.

In many chemical processes such as polymerization, alkylation, sulfonation, nitration and the like, it is desirable to maintain a substantially constant rate of production in order to obtain improved control over the quality of the final product. Stabilizing the production rate also facilitates control over other reaction process variables such as the temperature and pressure. Stabilized product rate and quality improves the operation of the associated processing equipment as well. It has been common practice in the art to control continuous processes automatically by sensing individual variables such as flow rate, temperature or pressure directly and to attempt to regulate these variables to constant values. Although some semblance of constant production rate can be obtained in this manner, it is desirable that a more direct and comprehensive method of control be utilized.

According to our invention, a method is provided whereby a direct measurement of the rate of production can be obtained and this measurement then employed to control a variable of the process which has a direct effect upon the production rate. The control method and apparatus of our invention are based upon the principle of the material balance and employ a unique combination of automatic control features to produce a control signal which is a direct function of the production rate. Our invention is applied to those continuous chemical reactions in which no one of the reactants is completely depleted. Broadly, the method comprises sensing the mass rate of flow of reactant to the reaction zone and producing a first output as a function of this rate of flow, sensing the mass rate of flow of reactant remaining unreacted in the reaction effluent and producing a second output as a function of the rate of flow of this unreacted reactant, producing a third output as a function of the difference between said first and second outputs, and applying this third output to control a variable of the reaction which directly affects production rate. The apparatus of our invention employed in combination with a reactor comprises the means for sensing the rate of flow of reactant to the reactor, means for producing a first output as a function of this rate of flow, means for sensing the rate of flow of unreacted reactant from the reactor, means for producing a second output as a function of the rate of flow of unreacted reactant, means for producing a third output as a function of the difference between said first and second outputs, and means for controlling a reaction variable in response to said third output.

In a preferred aspect of our invention, the method and apparatus for controlling a continuous chemical reaction are provided wherein the reaction is conducted in a reaction zone and a portion of the reactor effluent is vaporized in an equilibrium flash zone to produce a vapor phase containing unreacted reactant and a liquid phase containing product. In this preferred aspect, provision is made for applying a correction factor to the measurements of reactant leaving the flash zone in response to measurements of the rate of change of liquid level in the flash zone. In still another preferred aspect, an additional correction factor is applied in order to compensate for changes in the temperature within the reaction zone. While provision can be made for maintaining the temperature of the reaction substantially constant and also for maintaining a substantially uniform liquid level in the flash zone, it is nevertheless highly advantageous from the standpoint of continuous reaction control to provide for corrections in response to momentary changes in both reactor temperature and flash tank liquid level. These corrections allow for temporary upsets or surges within the process itself and prevent inaccurate calculations of reaction production rate from being made which would only result in deviation from the desired production rate or could induce cycling of the control systems.

It is an object of our invention to provide an improved method for controlling a continuous chemical process.

Another object of our invention is to provide an improved control system which can be employed with a reactor to maintain a substantially constant production rate for the process being carried out within said reactor.

Another object of our invention is to provide for the automatic control of a continuous chemical process in order to obtain a substantially constant rate of production.

Still another object is to provide for the control of a continuous reaction by making a continuous material balance of the reactant to and from said reactor while providing corrections for momentary errors introduced as a result of temperature change within the reactor.

A further object is to provide for the continuous control over a chemical reaction by use of the reactant material balance while making corrections for changes in the liquid level within the flash zone in which the reactor effluent is partially vaporized to separate unreacted reactant vapor from the liquid effluent containing the product.

Figure 2:
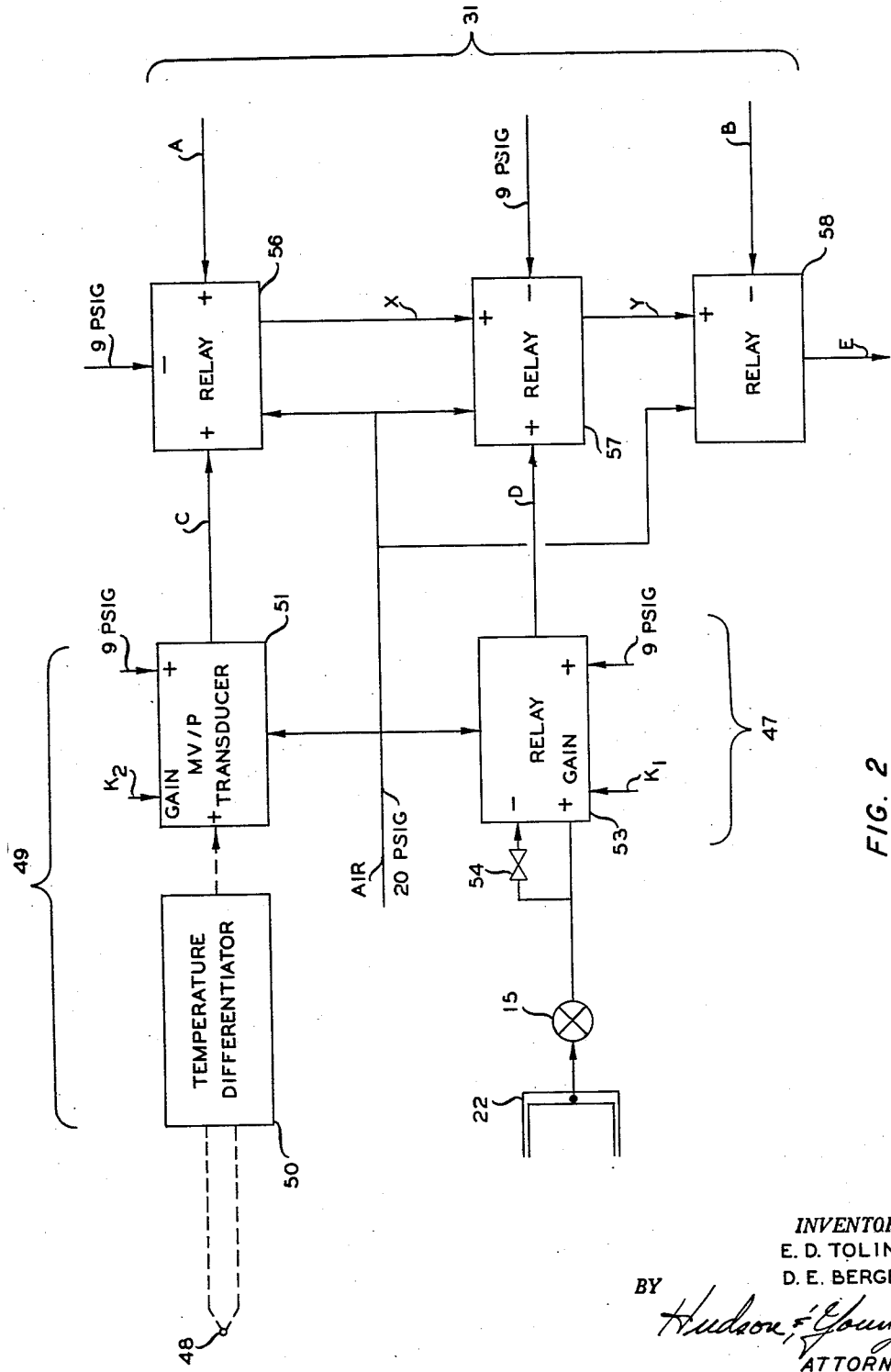

Other objects, advantages and features of our invention will become apparent to those skilled in the art from the following description and drawings in which:

FIGURE 1 is an over-all schematic diagram showing the combination of control features according to our invention; and FIGURE 2 is a schematic diagram showing details of the control features which provide for the corrections as a result of changes in reactor temperature and liquid level in the flash zone.

While our invention can advantageously be applied in many continuous chemical reactions which do not reach completion so that the rate of production can be indicated by a material balance on one of the reactants which is not completely consumed within the reaction, it is of special advantage in the control of chemical reactions wherein a reactant of low boiling temperature is dissolved in a liquid diluent and chemically combined in the liquid phase. Our invention is of particular importance in the control of polymerization reactions and especially those polymerization reactions involving low boiling or normally gaseous materials such as ethylene, propylene, butylene or butadiene. Not only is our invention readily adaptable to the control of polymerization reactions but it is of special advantage in connection with such processes because of the high importance of maintaining substantially constant polymerization rates. In the formation of high polymers, the average molecular weight and also the molecular weight distribution within the polymer can be affected by the rate of polymerization. The rate of polymerization may also have a substantial effect upon the temperature and pressure of the reaction. In the case of catalytic polymerizations, our invention is preferably employed to control the rate of catalyst addition to the reaction zone since in this manner the ultimate control output can be applied to a variable which has a direct and substantial effect upon the polymer production rate. An example of a catalytic polymerization which can be controlled with the method and apparatus of our invention is the polymerization described in the patent to Hogan et al., U.S. 2,825,721. In order to clarify the explanation of our invention, the description of the control system as shown in the drawings will be described in connection with polymerization of a normally gaseous material such as ethylene. It should be understood, however, that our invention is not limited to such a process nor to a single reactant.

Referring now to FIGURE 1, there is shown a polymerization reactor 10 which is provided with an agitator 11 driven by motor 12 and separate feed lines 13, 14 and 16 for solvent, catalyst and monomer, respectively. Only those details of the polymerization reactor which are necessary for a complete understanding of our invention are shown. For example, the reactor is usually equipped with a jacket and/or heat transfer coils in order to remove the heat of reaction. The feed conduits entering the reactor are shown schematically and it is frequently desirable that these conduits enter at a particular point or at several points within the reactor in order to insure rapid and thorough distribution of the materials added. Each of these lines is also normally provided with the means for controlling the flow therethrough at a substantially constant rate. Such means are conventional in the art and are shown only where they will aid in an understanding of our invention.

Reactor 10 in this illustration is operated liquid full and the effluent is continuously passed through conduit 17 to flash vessel 18. Valve 19 is shown in line 17 in order to provide for a reduction in pressure between reactor 10 and flash vessel 18. Frequently, valve 19 is a diaphragm motor valve controlled in response to a pressure measurement within reactor 10.

In the polymerization of ethylene brought about by a catalyst such as the chromium oxide-containing catalyst described in the above-mentioned patent to Hogan et al., the solvent is sometimes maintained saturated with monomer so that the reaction zone contains a mixture of monomer-saturated solvent as a liquid and additional monomer as a vapor phase dispersed in the liquid phase. As the reaction effluent, which contains polymer, catalyst, solvent, and unreacted monomer in both the dissolved and free states, passes into flash zone 18 wherein the pressure is substantially reduced, additional monomer and some solvent vaporizes and separates from the unvolatilized liquid. If desired, a heater may be installed in line 17 and/or in the liquid phase of flash tank 18 in order to increase the amount of vaporization which takes place within flash tank 18. Although only one flash zone is shown in FIGURE 1, it should be understood that the invention can also be practiced using multiple flash zones in series or parallel in which case multiple measurements would be made and added together in the same manner as will be described in connection with single flash zone 18. The practice of our invention can be simplified in situations wherein multiple flashing zones are employed in series and the conditions of the first flash zone are such that most or substantially all of the unreacted monomer is flashed into the vapor state. In this case, a single measurement as shown in FIGURE 1 can be made and the conditions of the downstream flashing zones neglected by using an assumed constant value of unreacted monomer leaving flash tank 18 with the liquid phase.

A vapor phase 20 and a liquid phase 21 are maintained within flash tank 18. A level measurement device 22 is employed to sense the liquid level within flash tank 18 to produce a signal which is applied through transducer 15 and controller 23 to motor valve 24 in line 26. Liquid effluent is withdrawn from flash tank 18 through line 26 and the flow rate is regulated by motor valve 24 in such a manner as to maintain a substantially constant liquid level within the flash tank. It should be understood that while this provision is made for maintaining a relatively uniform liquid level within the flash tank the process is still subject to dynamic behavior which will produce momentary increases or decreases in the liquid level. This has an effect upon the measurements of unreacted monomer leaving the reactor, as will be explained subsequently. The vapors which are formed in flash tank 18 are withdrawn overhead through line 27 passing through valve 28. Valve 28 can be a diaphragm motor valve operated responsive to a pressure measurement within flash tank 18. In such a manner the pressure within flash tank 18 can be maintained at a relatively constant value.

The description of FIGURE 1 so far defines a process to which our invention is especially well adapted. Such a process often involves a catalytic polymerization reaction employing a solvent and low-boiling monomer in an amount sufficient to saturate said solvent under the conditions of temperature and pressure within the reactor. Likewise, the liquid in the flash tank through which the reaction effluent is passed to separate unreacted monomer from the remainder of the reaction effluent is saturated with monomer, the concentration being less than that in the reactor principally because of the lower pressure. The monomer vapor stream is passed to recovery steps which are not shown and the repurified monomer is ultimately recycled to the reactor. The polymer stream in line 26 is likewise passed to recovery steps in order to separate the polymer from the solvent and catalyst associated therewith.

In the control method of our invention the flow of reactant, in this case a low-boiling monomer such as ethylene, fed to the reactor 10 is sensed and an output is produced as a function of the rate of flow of this reactant to the reaction. As shown in FIGURE 1, the flow rate of the monomer stream in line 16 is sensed across orifice 29 and the pressure differential representing the square of rate of flow through line 16 is transmitted to flow transducer 30. The signal from transducer 30 is passed to square root extractor 25 which produces an output signal as a function of the mass rate of flow of the monomer stream. In most situations the temperature and pressure of the monomer stream in line 16 can be assumed constant so that square root extractor 25 can be calibrated to produce an output directly as a function of mass flow rate. Otherwise necessary corrections can be made through a computer. A suitable square root extractor is the Sorteberg Force Bridge, Type S, manufactured by the Minneapolis-Honeywell Regulator Company, Philadelphia, Pennsylvania, and described in this company's Catalog C80-1, published December 1958.

If the monomer stream is substantially pure, the output from the square root extractor can be transmitted directly to computer 31. By the same token, if the concentration of monomer in the stream flowing through line 16 is substantially constant, square root extractor 25 can be calibrated to reflect this concentration automatically or the concentration factor can be applied to the flow measurement as a constant input to multiplier 32. It is more frequently the case, however, that the stream in line 16 is subject not only to variations in flow rate but also to variations in monomer concentration. It is desirable, therefore, that a continuous analysis of the monomer feed stream be made. A portion of the monomer stream is passed by conduits 33 and 52 through analyzer 36. There are a number of suitable commercial continuous analyzers which can be used to detect the percent of ethylene in a feed stream. One type of analyzer which is suitable is that described in U.S. Patent 2,579,825, issued to J. W. Hutchins. In general, instruments such as a differential refractometer, infrared analyzer, mass spectrometer or vapor phase chromatograph can be employed to detect the concentration of such a component.

The output from analyzer 36 which is a function of the percent ethylene in the monomer stream is applied to multiplier 32 together with the output from square root extractor 25. In the example shown, the outputs from analyzer 36 and from square root extractor 25 are pneumatic signals and the multiplier can be, for example, a Sorteberg Force Bridge, Type M, as described in said Catalog C80–1 of the Minneapolis-Honeywell Regulator Company. Multiplier 32 produces an output potential "A" which is a function of the rate of ethylene fed to reactor 10. Output A, which is preferably a pneumatic signal in the 3 to 15 p.s.i.g. range, is transmitted to computer 31.

In a manner similar to the measurement of the monomer feed, the overhead vapors from flash tank 18 are measured to determine the concentration of unreacted ethylene in these vapors. A measurement is also made to determine the mass flow rate at which unreacted ethylene is removed in the vapor phase from flash tank 18. The rate at which vapors pass through conduit 27 is sensed across orifice 33 with transducer 34 and square root extractor 35 producing an output which is a function of the mass rate of flow of said vapors. A sample of these vapors passes by conduits 36 and 37 through analyzer 38 which can be the same type as described in connection with analysis of the monomer feed. The outputs from analyzer 38 and from square root extractor 35 are applied to a multiplier 39 which produces an output as the function of the rate of flow of unreacted ethylene through conduit 27. While not a preferred method, it is possible to assume a constant monomer concentration in the overhead vapors from flash tank 18 and dispense with analyzer 38. In this case, square root extractor 35 can be calibrated to produce an output which is a function of the ethylene flow rate, or a constant of proportionality factor can be applied to multiplier 39 instead of the output from analyzer 38.

The flow rate of the liquid stream flowing through line 26 is sensed by measurement across orifice 40. Transducer 41 and square root extractor 45 produce an output which is a function of the mass rate of flow of material through line 26. In systems employing a low-boiling or normally gaseous monomer in a substantially high-boiling reaction diluent or solvent such as hydrocarbons having from 5 to 12 carbon atoms per molecule, the concentration of monomer in the liquid flowing through line 26 can be regulated to be quate small, for example, less than 2 weight percent. While this concentration is subject to changes during the course of the process, since the total concentration is fairly small and is regulated by flash tank temperature and pressure, the changes can be neglected and a calibration can be made in square root extractor 45 so that the output thereof is a function of the unreacted ethylene flow rate through line 26. Alternatively, an analyzer can be employed to detect the concentration of ethylene in the liquid stream flowing through line 26. In this case, it is desirable to effect a separation of catalyst and polymer from the sample stream prior to making the analysis for unreacted ethylene. As another alternative, it is possible to sense the temperature and pressure within flash zone 18 and, with the output from multiplier 39. The measurement of the flow rate through line 26 and the measurement of solvent feed flow in line 13 perform an automatic, continuous flash calculation which produces as its result the mass flow rate of ethylene in the reactor effluent stream, line 17.

In the system described, however, the concentration of ethylene in the liquid stream leaving flash tank 18 is small enough that the changes can be neglected and the output from square root extractor 45 is added directly to the output from multiplier 39. These two outputs are applied to an adding relay 42, such as the Foxboro Adding Relay as described in the Technical Information Bulletin 37–A–57A published by the Foxboro Company, Foxboro, Massachusetts, September 12, 1956. This adding relay handles pneumatic signals and produces a pneumatic signal "B" which is a function of the ethylene unreacted in reactor 10 and leaving flash tank 18. Output B is supplied to computer 31.

In a broad aspect of the invention, computer 31 is simply a subtracting relay as described in the above-mentioned Foxboro bulletin and output B is subtracted directly from output A to produce a third output E which is a function of the rate of monomer consumption within reactor 10. Since the monomer consumed is equal to the polymer formed, this output is also a function of the production rate and can be applied directly to control a variable of the process which affects the rate of production. In FIGURE 1 output E is applied through production rate controller 55 to manipulate the set point of flow recorder controller 43. A Foxboro Model 58 controller with proportional and integral modes of control can be used for production rate controller 55. Controller 43 controls the operation of motor valve 44 in catalyst line 14 in response to a flow measurement made across orifice 46 also in conduit 14.

In this embodiment, as the production rate tends to increase more of the monomer fed to the reactor will be consumed in the formation of polymer and the difference between outputs A and B applied to computer 31 will increase. Output E thereby increases and controller 55 resets controller 43 in order to decrease the flow rate of catalyst through line 14. The decrease in the catalyst flow rate produces a decrease in production rate thereby returning the rate of production to the desired set point value. By the same token, should the rate of reaction tend to decrease, for example, because additional trace quantities of catalyst poisons enter the reactor through its feed streams, the difference between outputs A and B would decrease and output E would likewise decrease. Controller 43 would then be reset to require an increased flow of catalyst to reactor 10 so that the reaction rate would return to normal.

As explained above, although provision is made for maintaining the liquid level in flash tank 18, substantially constant, because of the inherent characteristics of feedback control systems there is still the likelihood of momentary increases or decreases in the liquid level which will produce a change in the amount of vapor flowing through line 27. As the liquid level increases, vapors within vapor space 20 of the flash tank 18 are displaced from the flash tank and liquid is accumulated therein, thereby producing an abnormally high rate of vapor flow through line 27 and a lower liquid flow rate in line 26. This change in rates of flow through lines 26 and 27 is reflected in output B from adding relay 42 as an increase or decrease, as the case may be, in unreacted monomer from the reactor. Thus, output E is changed to reflect a changed rate of production whereas this is not actually the case. According to a preferred aspect of the invention, a correction is applied to computer 31 in order to compensate for changes in the liquid level of the flash tank. Level indicator 22 produces a mechanical signal which is converted to a pneumatic signal by transducer 15. If an instrument such as the Fisher Governor Level Indicator-Controller is used, transducer 15 is unnecessary as this instrument produces a 3 to 15 p.s.i. signal proportional to level when its set point is at zero and its proportional band equals 100 percent. This signal which is indicative of the liquid level in flash tank 18 is applied directly to computer 47 and to liquid level controller 23. Computer 47 is described later in greater detail in connection with FIGURE 2. This computer differentiates the liquid level with respect to time and produces a pneumatic signal which has been multiplied by a constant $K_1$. Constant $K_1$ is a proportionality factor for the amount of ethylene displaced from tank 18 per unit increase in liquid level within said tank. Output D from computer 47 is therefore a function of the change in monomer flow rates through lines 26 and 27 as a result of changes in the liquid level within flash tank 18. When output D represents a positive value, that, when $K_1$ is positive and there has been an increase in the liquid level in the flash tank, output B is increased by a dynamic error which is equal to output D. Therefore, in order to effect the correction in output E from computer 31, outputs A and D are added and from this sum output B is subtracted.

The proportionality factor $K_1$ can be calculated from known operating conditions of the flash tank or it can be determined by measurements during operation. The units of $K_1$ can be, for example, pounds of ethylene displaced from the flash tank per inch increase in liquid level. Under most circumstances $K_1$ will be positive, but it can be a negative value; that is, monomer is accumulated in the flash tank as the liquid level rises. The latter condition might prevail when the flash operation is conducted at relatively low pressure and temperature so that there is more unreacted monomer in a cubic foot of liquid than in a cubic foot of vapor.

Assuming conditions of 290 p.s.i.g. and 300° F. for the flash operation with 50 weight percent ethylene, 50 percent cyclohexane in the flash tank vapor phase, and 0.67 weight percent ethylene in the liquid phase which has a density of 6 pounds per gallon, one cubic foot in the flash tank holds 0.72 pound of ethylene in the vapor phase and 0.30 pound of ethylene in the liquid phase. Thus, a liquid level rise of 1 inch in a tank having a diameter of 10 feet displaces 6.55 cubic feet of vapor and accumulates the same volume of liquid. The net result is to displace 2.7 pounds of ethylene; hence, $K_1$ equals 2.7 pounds of ethylene displaced per inch increase in liquid level.

While the embodiment shown in FIGURE 1 is preferred, it is possible to produce the correction in output B by applying output D from computer 47 to adding relay 42. In both this case and the one shown in FIGURE 1, the proportionality factor $K_1$ can be derived by assuming a constant percentage of unreacted ethylene in the vapor passing from flash tank 18. Since this correction is relatively small such an assumption will not produce a substantial error in the end result. However, it is possible to avoid even this error by basing factor $K_1$ on the volume of the total vapor displaced from flash tank 18 as a result of a unit increase in liquid level and applying the output from computer 47 to another adding relay between square root extractor 35 and multiplier 39. In other words, the output from square root extractor 35 reflecting the amount of vapor flow per unit of time within conduit 27 is altered by an amount which is determined by the rate of change of liquid level within the flash tank. This corrected flow rate is then applied to multiplier 39 and together with the result of analyzer 38 produces an output which represents the flow rate of unreacted ethylene through line 27 corrected for increases or decreases in the liquid level within the flash tank. A similar correction can be made in the measured liquid flow rate.

As a further embodiment of our invention provision is made for the correction of errors introduced through dynamic behavior of temperature within the reactor. As pointed out above, the reactor contains a solvent which is saturated with a low-boiling or normally gaseous monomer such as ethylene and the material within the reactor is a mixture of solvent saturated with said ethylene and gaseous ethylene. As the temperature within the reactor rises, there is a tendency to reduce the solubility of the ethylene in the solvent so that some dissolved ethylene is transferred to the vapor phase and is displaced in the reaction effluent from the reactor through line 17. The net result is an increase in the flow of unreacted ethylene through line 27 because of an increase in the temperature within reactor 10. If output B is permitted to remain uncorrected as a result of this increase in reactor temperature, it will appear that the rate of production has diminished whereas actually there has been no change. Output E would be decreased and the rate of catalyst flow through line 14 would be increased in order to increase the rate of reaction. It is desirable, therefore, to introduce another correction which compensates for the abnormally high or low value for output B as a result of increase or decrease, respectively, in the reactor temperature.

The temperature within reactor 10 is sensed by thermistor element 48. Thermistor 48 produces an output which is transmitted to computer 49. This computer is shown in greater detail in FIGURE 2 and will be discussed more fully later. Within computer 49 the reactor temperature is differentiated with respect to time and the output thus produced is multiplied by a proportionality factor $K_2$ which is the amount of ethylene displaced from reactor 10 per degree of increase in temperature within the reactor. Computer 49 produces output C which is a function of the rate of displacement of ethylene from reactor 10 as a result of changes in the reactor temperature. Output C is applied to computer 31 and is added to output A and output D. Output C is added to output A because when output C represents a positive value or an increase in reactor temperature the error introduced makes output B abnormally high. Output E from computer 31 is thereby corrected to provide a reliable indication of production rate as corrected for momentary changes in reactor temperature and liquid level of the flash tank.

Factor $K_2$ can be calculated or determined by operating measurements. The units of $K_2$ are, for example, pounds of ethylene displaced from the reactor per degree F. rise in temperature. The solubility of the monomer in the reaction liquid determines the value of $K_2$. For example, in a 3300 gallon reactor containing 5 weight percent ethylene in cyclohexane at 410 p.s.i.g. and 250° F., a rise in temperature of 1° F. displaces about 3.7 pounds of ethylene from the liquid phase. This ethylene rises to the top of the reactor as shown in FIGURE 1 and is removed in the effluent, passing into flash vessel 18 and overhead as vapor in line 27.

FIGURE 2 shows an embodiment for computers 31, 47 and 49 in greater detail. Temperature computer 49 is shown comprising two units: temperature differentiator 50 and electric to pneumatic transducer 51. Thermistor 48 is one arm of a bridge which produces an electrical signal in the differentiator 50. A suitable reactor temperature differentiator is described in Preprint No. 24–59 of the Instrument Society of America on a paper presented by E. D. Tolin and D. A. Fluegel at the 14th Annual Instrument-Automation Conference and Exhibit, Chicago, Illinois, September 21–25, 1959, published in the ISA Journal, October 1959. This temperature differentiator mathematically differentiates the changes in reactor temperature with respect to time and produces a millivolt signal which is transmitted to transducer 51. This millivolt signal may vary from $-5$ to $+5$ millivolts with zero or no change in temperature with respect to time represented by zero voltage. Transducer 51 is a MV/P transmitter, such as transducer Model 700T of Taylor Instrument Company. Within transducer 51 the signal from differentiator 50 is modified by a factor $K_2$ which represents the amount of ethylene displaced from reactor 10 per degree increase in reactor temperature. $K_2$ is introduced as the gain in transducer 51. Transducer 51 produces a pneumatic signal based on the millivolt output from differentiator 50. Nine p.s.i.g. is added so that this pneumatic signal varies from 3 to 15 p.s.i.g. and is a function of the rate of change of temperature within the reactor with respect to time with 9 p.s.i.g. as the zero $dT/dt$. The output of transducer 51 is output C mentioned earlier.

Liquid level computer 47 is an adding relay 53 such as a Foxboro M56 adding relay modified as described in U.S. Patent 2,677,385 for differentiation. When $K_1$ is positive this modification is made by passing the pneumatic level measurement signal from transducer 15 to an adding input of the relay and passing the same signal through line restriction 54 to the subtracting input. Restriction 54 can be a Foxboro adjustable restrictor such as described in U.S. Patent 2,432,082. Within relay 53 the differentiated liquid level signal is modified by the factor $K_1$ which is applied as the gain and 9 p.s.i.g. is added so that the output from differentiator 53 is a pneumatic signal varying from 3 to 15 p.s.i.g. and is a function of the rate of change of liquid level within the flash tank with respect to time. In this signal 9 p.s.i.g. represents no change in liquid level in the flash tank with respect to time. When $K_1$ is negative, that is, when an increase in liquid level accumulates monomer in the flash tank, the direct signal from transducer 15 is passed to the subtracting input of relay 53 and the delayed signal which passes through restriction 54 enters the adding input of relay 53. In other words, the inputs of relay 53 from transducer 15 determine the sign of the output signal D, i.e., whether it is above or below 9 p.s.i.g.

Computer 31 is an adding-subtracting relay and can be a single instrument or a combination of several instruments. For purposes of simplicity computer 31 is shown in FIGURE 2 as three separate relays of the type described in the Foxboro Bulletin 37-A-57A mentioned above. These are relays 56, 57 and 58. Output A which is a function of the rate of ethylene fed to the reactor is transmitted to relay 56 together with output C from transducer 51. Potentials A and C are added in relay 56 and from this sum 9 p.s.i.g. is subtracted. Since the mid scale in transducer 51 is 9 p.s.i.g., the output from transducer 51 is artificially 9 p.s.i.g. high. This scaling is done in order to stay within the 3 to 15 p.s.i.g. limits imposed by commercially available instrumentation.

Output X from relay 56 is transmitted to relay 57 into which output D from relay 53 also is introduced. Outputs X and D are added and from this sum 9 p.s.i.g. is subtracted to produce an output Y which is transmitted to relay 58. The output of relay 57 is decreased by the 9 p.s.i.g. which was added in relay 53. Nine p.s.i.g. was added at this point to scale the system as previously discussed. In relay 58 output B which represents the measured unreacted ethylene leaving the system is subtracted from output Y. Thus, output E is produced which represents the difference in the rate of ethylene fed to reactor 10 and the rate of ethylene removed from flash tank 18 as corrected by errors introduced through changes in the liquid level of the flash tank and the temperature of the reactor. Output E, which is the measurement of rate of polymer production, is applied through production rate controller 55 to control a variable of the process such as catalyst flow rate as previously described.

While specific instruments have been mentioned in connection with FIGURES 1 and 2, it is to be understood that substitution of other instruments which perform the same function is well within the capability of one having ordinary skill in the automatic control art. For example, the description of the invention has employed pneumatic signals principally and it is to be understood that a completely electrical system can be employed to perform the same individual functions. The invention does not reside in any single control sensing element, instrument, or computing device per se, but rather in the combination of these control features to arrive at an indication of actual production rates within a reaction zone.

In further illustration of our invention, the following specific example is given. It should be understood that this example is typically only and should not be construed to limit our invention unduly.

*Example*

Ethylene is polymerized continuously in a 3300-gallon reactor in the presence of a catalyst containing 2.2 weight percent chromium oxide associated with a 90/10 silica-alumina support, 1.6 weight percent chromium being in the hexavalent state. The solvent of the reaction is cyclohexane which is saturated with ethylene at a temperature of 250° F. and a pressure of 410 p.s.i.g. Under steady state conditions, catalyst is fed to the reactor in the form of a slurry at a rate of one pound of catalyst per hour and the solvent is introduced at a rate of 7200 pounds per hours. The ethylene-containing stream is fed to the reactor at the rate of 1,000 pounds per hour and the concentration of ethylene in the liquid phase within the reactor is 5 weight percent. Polymer is produced at a desired rate of approximately 600 pounds per hour. The reaction effluent is continuously withdrawn and passed to a flash tank operating at a pressure of 290 p.s.i.g. and a temperature of 300° F. Liquid is withdrawn from the flash tank at a rate of approximately 7500 pounds per hour and vapor is taken overhead from the flash tank at a rate of approximately 700 pounds per hour. The concentration of ethylene in the overhead vapors is approximately 50 weight percent, and the concentration of ethylene in the liquid and the flash tank is 0.67 weight percent. The monomer feed stream contains approximately 100 percent ethylene so that the feed rate of ethylene to the reactor is about 1,000 pounds per hour. A pneumatic potential A in the range of 3 to 15 p.s.i.g. as a function of this feed rate is transmitted to computer 31. The flow rate of ethylene from the flash tank in the vapor is 350 pounds per hour as represented by the output from multiplier 39. Square root extractor 45 is calibrated to transmit an output to relay 42 directly as a function of the pounds of ethylene per hour being removed in the liquid stream in line 26. Under normal conditions this is 50 pounds per hour. Adding relay 42 produces output B which represents a flow of ethylene from flash tank 18 under steady state conditions of 400 pounds per hour. The reaction rate as represented by the difference between outputs A and B is 600 pounds of polymer per hour, this rate being represented by output E, which is transmitted to production rate recorder controller 55 and is thereby transmitted as a control signal to manipulate the set point of flow recorder controller 43 and control the addition of catalyst to reactor 10.

Changes in temperature within the reactor are continuously sensed and differentiated with respect to time and multiplied by a proportionality factor equal to 3.7 pounds of ethylene displaced from the reactor per degree Fahrenheit rise in reactor temperature to produce an output C. Likewise, changes in liquid level within the flash tank are continuously sensed and differentiated with respect to time and multiplied by the proportionality factor equal to 2.7 pounds of ethylene displaced from said flash tank per inch increase in liquid level within the flash tank to produce an output D. The addition of potentials C and D to potential A in computer 31 corrects for dynamic behavior errors introduced in output B as a result of changes in the reactor temperature or flash tank liquid level which would otherwise seriously depreciate the quality of automatic control obtainable.

This can be illustrated as follows. Assume the production rate falls from 600 to 550 pounds of polymer per hour due to, for example, trace amounts of catalyst poisons entering the reactor in the solvent feed. The flow of unreacted ethylene should, therefore, increase from 400 to 450 pounds per hour. At the same time, however, because of the dynamic behavior of the system, the reactor temperature begins dropping at a rate of 10° F. per hour and the liquid level in the flash tank begins to drop at a rate of 10 inches per hour. The combined effect of these changes in reactor temperature and flash tank liquid level is to reduce the ethylene flow rate from the flash tank from about 450 to about 386 pounds per hour. It can be seen that if the above-described corrections were not made in this instance, the corrective action taken would be to decrease catalyst feed rate rather than to raise it as is necessary to restore production rate to its desired value.

While the above description and examples present the preferred application of our invention, it should not be considered as limited to these embodiments. In addition to polymerization our control method and apparatus has utility in processes such as esterification, e.g., the synthesis of ethyl acetate from acetic acid and ethyl alcohol; hydrolysis such as the hydrolysis of fats to glycerine and fatty acids; ammonia synthesis from hydrogen and nitrogen; oxidation such as the partial conversion of hydrogen sulfide to sulfur dioxide preparatory to reacting hydrogen sulfide and sulfur dioxide catalytically to form sulfur as described in the copending application of F. W. Karasek, Serial No. 686,348, filed September 26, 1957, now Patent No. 3,026,184; and the like. In these processes one of the reactants which is not completely consumed in the reaction can be measured entering and leaving the reaction zone and the rate of production of the desired product can be controlled by manipulating a variable of the process such as catalyst concentration, temperature or reactant feed rates in response to the differential measurement. Those skilled in the art will be able to make other applications and modifications of our invention without departing from the spirit or scope thereof.

We claim:

1. An improved method of controlling a continuous chemical reaction which proceeds short of completion in a reaction zone which comprises sensing the rate of flow of a reactant to said zone, producing a first output as a function of said rate of flow of reactant to said zone, separating unreacted reactant from said reaction effluent and passing said unreacted reactant from the reaction system, sensing the rate of flow of said unreacted reactant passing from said system, producing a second output as a function of said rate of flow of unreacted reactant, sensing the rate of change of a variable of the process which produces a displacement of reactant from said system, producing a third output as a function of said rate of change of said variable times a factor relating change in said variable to the amount of said displacement, applying said first, second and third outputs to produce a fourth output as a function of the difference in potential between said second output and the sum of said first and third outputs, and applying said fourth output to control a variable of said reaction directly affecting reaction rate.

2. The method of claim 1 wherein said chemical reaction is polymerization and said reactant is monomer.

3. The method of claim 2 wherein said variable controlled by said fourth output is rate of catalyst flow to said reaction zone.

4. An improved method of controlling a continuous chemical reaction wherein liquid diluent is saturated with low boiling reactant which is chemically combined in a reaction zone, the effluent from said reaction zone is processed in a second zone to form a vapor stream of unreacted low boiling reactant, and the vapor and the remaining liquid effluent are continuously and separately withdrawn from said second zone, which comprises sensing the rate of flow of low boiling reactant to said reaction zone, producing a first output as a function of said rate of flow of reactant to said reaction zone, sensing the rate of flow of unreacted reactant as vapor from said second zone, producing a second output as a function of said rate of flow of unreacted reactant vapor, sensing the rate of change of temperature in said reaction zone, producing a third output as a function of said rate of change of temperature times a factor relating change in temperature with reactant displaced from said reaction zone, producing a fourth output as a function of the difference between the potential of said second output and the sum of the potentials of said first and third output, and applying said fourth output to control a variable of the reaction directly affecting reaction rate.

5. An improved method of controlling a continuous chemical reaction wherein low boiling reactant dissolved in liquid diluent is chemically combined in a reaction zone, the effluent from said reaction zone is flashed in a flash zone to form vapor containing unreacted low boiling reactant and a body of liquid, and vapor and liquid are continuously and separately withdrawn from said flash zone, which comprises sensing the rate of flow of low boiling reactant to said reaction zone, producing a first output as a function of said rate of flow of reactant to said reaction zone, sensing the rate of flow of unreacted reactant as vapor from said flash zone, producing a second output as a function of said rate of flow of unreacted reactant vapor, sensing the rate of change of liquid level in said flash zone, producing a third output as a function of said rate of change of liquid level times a factor relating change in liquid level with reactant vapor displaced from said flash zone, producing a fourth output as a function of the difference between the potential of said second output and the sum of the potentials of said first and third outputs, and applying said fourth output to control a variable of said reaction directly affecting production rate.

6. An improved method of controlling a continuous chemical reaction wherein liquid diluent is saturated with low boiling reactant which is chemically combined in a reaction zone, the effluent from said reaction zone is flashed in a flash zone to form vapor containing unreacted low boiling reactant and a body of liquid, and vapor and liquid are continuously and separately withdrawn from said flash zone, which comprises sensing the rate of flow of low boiling reactant to said reaction zone, producing a first output as a function of said rate of flow of reactant to said reaction zone, sensing the rate of flow of unreacted reactant as vapor from said flash zone, producing a second output as a function of said rate of flow of unreacted reactant vapor, sensing the rate of change of liquid level in said flash zone, producing a third output as a function of said rate of change of liquid level times a factor relating change in liquid level with reactant vapor displaced from said flash zone, sensing the rate of change of temperature in said reaction zone, producing a fourth output as a function of said rate of change of temperature times a factor relating change in temperature with reactant displaced from said reaction zone, producing a fifth output as a function of the difference between the potential of said second output and the sum of the potentials of said first, third and fourth outputs, and applying said fifth output to control a variable of said reaction directly affecting production rate.

7. The method of claim 6 wherein said reaction is polymerization, said low boiling reactant is monomer, and said variable controlled by said fifth output is catalyst flow rate to said reaction zone.

8. An improved method of controlling a catalytic polymerization reaction wherein a normal gaseous monomer is polymerized in a liquid solvent in a reaction zone, said solvent being saturated with said monomer, the effluent from said reaction zone is flashed in a flash zone to form a vapor containing most of the unreacted monomer and a body of liquid, and vapor and liquid are continuously and separately withdrawn from said flash zone, which comprises, sensing the rate of flow of monomer to said reaction zone, producing a first output as a function of said rate of monomer flow to said reaction zone, sensing the rate of flow of monomer vapor from said flash zone, sensing the rate of flow of liquid from said flash zone, producing a second output as a function of the sum of the monomer flow rates in said vapor and liquid from said flash zone, sensing the change in reaction zone temperature, differentiating said temperature change with respect to time to produce a third output as a function of the rate of reaction temperature change, multiplying said third output by a constant factor for amount of monomer displaced from said reaction zone per degree temperature rise in reaction temperature to produce a fourth output, sensing the change in liquid level in said flash zone, differentiating said liquid level change with respect to time to produce a fifth output as a function of the rate of change in said liquid level, multiplying said fifth output by a constant factor for amount of monomer displaced from said flash zone for a unit increase in said liquid level to produce a sixth output, producing a seventh output as a function of the difference between the potential of said second output and the sum of the potentials of said first, fourth, and sixth outputs, and applying said seventh output to control the rate of catalyst addition to said reaction zone.

9. The method of claim 8 wherein said monomer is ethylene and said solvent is cyclohexane.

10. In apparatus including a reactor, means for feeding reactant to said reactor, means for feeding solvent to said reactor, a flash tank, means for passing effluent from said reactor to said flash tank, means for withdrawing vapor from said flash tank, and means for withdrawing liquid from said flash tank, the improved control system comprising, in combination, means for sensing the rate of flow of reactant to said reactor and producing a first output as a function thereof, means for sensing the rate of flow of unreacted reactant in the vapor from said flash tank and producing a second output as a function thereof, means for sensing the rate of change in liquid level in said flash tank and producing a third output as a function thereof, means for producing a fourth output as a function of said third output times a factor for unreacted reactant displaced from said flash tank per unit increase in liquid level, means for producing a fifth output as a function of the difference between the potential of said second output and the sum of the potentials of said first and fourth outputs, and means for applying said fifth output to control a reaction variable.

11. An improved reactor control system comprising, in combination, means for sensing the rate of flow of reactant to said reactor, means for producing a first output as a function of said rate of flow of reactant to the reactor, means for separating unreacted reactant from the reaction effluent and passing the unreacted reactant from the reactor system, means for sensing the rate of flow of reactant passing from said system, means for producing a second output as a function of said unreacted reactant rate of flow, means for sensing the rate of change of a variable of the process which produces a displacement of reactant from said system, means for producing a third output as a function of said rate of change of said variable times a factor relating change in said variable to the amount of said displacement, means for producing a fourth output as a function of the difference between the potential of said second output and the sum of potentials of said first and third outputs, and means for controlling a reaction variable affecting reaction rate in response to said fourth output.

12. In apparatus including a reactor, means for feeding reactant to said reactor, means for feeding solvent to said reactor, a flash tank, means for passing effluent from said reactor to said flash tank, means for withdrawing vapor from said flash tank, and means for withdrawing liquid from said flash tank, the improved control system comprising, in combination, means for sensing the rate of flow of reactant to said reactor and producing a first output as a function thereof, means for sensing the rate of flow of unreacted reactant in the vapor from said flash tank and producing a second output as a function thereof, means for sensing the rate of change of reactor temperature and producing a third output as a function thereof, means for producing a fourth output as a function of said third output times a factor for unreacted reactant displaced from said reactor per degree rise in temperature, means for producing a fifth output as a function of the difference between the potential of said second output and the sum of the potentials of said first and fourth outputs, and means for applying said fifth output to control a reaction variable affecting reaction rate.

13. In polymerization apparatus including a reactor, means for feeding separately solvent, catalyst and monomer to said reactor, a flash tank, means for passing effluent from said reactor to said flash tank, means for withdrawing liquid from said flash tank to maintain a substantially constant liquid level therein, and means for withdrawing vapor from said flash tank, the improved control system comprising, in combination, means for sensing the rate of flow of monomer to said reactor and producing a first output as a function thereof, means for sensing the rate of flow of monomer in the vapor and liquid from said flash tank and producing a second output as a function thereof, means for sensing reactor temperature changes and differentiating same with respect to time to produce a third output as a function thereof, means of multiplying said third output by a proportionality factor for monomer displaced from said reactor per degree rise in temperature to produce a fourth output, means for sensing flash tank liquid level changes and differentiating same with respect to time to produce a fifth output, means for multiplying said fifth output by a proportionality factor for monomer displaced from said flash tank per unit increase in liquid level to produce a sixth output, means for adding the potentials of said first, fourth and sixth outputs and subtracting the potential of said second output to produce a seventh output, and means for controlling the rate of catalyst addition to said reactor in response to said seventh output.

14. The control system of claim 13 wherein said first, second, fourth, fifth, sixth and seventh outputs are pneumatic signals and said third output is an electrical signal.

References Cited in the file of this patent

UNITED STATES PATENTS

| | | |
|---|---|---|
| 2,518,307 | Groebe | Aug. 8, 1950 |
| 2,908,734 | Cottle | Oct. 13, 1959 |
| 2,964,511 | Cottle | Dec. 13, 1960 |
| 2,974,017 | Morgan | Mar. 7, 1961 |